United States Patent
Kuhnke

(10) Patent No.: US 9,366,852 B2
(45) Date of Patent: Jun. 14, 2016

(54) CORNER REFLECTOR

(71) Applicant: GuS Periscopes GmbH & Co. KG, Luebbecke (DE)

(72) Inventor: Dieter Kuhnke, Luebbecke (DE)

(73) Assignee: Gus Periscopes GmbH & Co. KG, Luebbecke (DE)

( * ) Notice: Subject to any disclaimer, the term of this patent is extended or adjusted under 35 U.S.C. 154(b) by 0 days.

(21) Appl. No.: 14/556,433

(22) Filed: Dec. 1, 2014

(65) Prior Publication Data
US 2015/0153562 A1 Jun. 4, 2015

(30) Foreign Application Priority Data

Nov. 29, 2013 (DE) .................. 10 2013 113 223

(51) Int. Cl.
| | | |
|---|---|---|
| G02B 23/08 | (2006.01) | |
| F41H 5/26 | (2006.01) | |
| F21V 33/00 | (2006.01) | |

(52) U.S. Cl.
CPC ............ *G02B 23/08* (2013.01); *F21V 33/00* (2013.01); *F41H 5/266* (2013.01)

(58) Field of Classification Search
CPC .......... G02B 23/08; F41H 5/266; F21V 33/00
USPC ................................................ 359/400, 402
See application file for complete search history.

(56) References Cited

U.S. PATENT DOCUMENTS

| | | | | | |
|---|---|---|---|---|---|
| 4,518,990 | A | * | 5/1985 | Gilvydis | F41G 3/165 348/148 |
| 5,943,163 | A | * | 8/1999 | Tartaglia | G02B 23/08 359/351 |
| 5,982,536 | A | * | 11/1999 | Swan | F41H 5/266 345/1.3 |
| 8,264,770 | B2 | * | 9/2012 | Minor | F41G 1/40 359/402 |
| 2010/0201676 | A1 | | 8/2010 | Minor et al. | |
| 2011/0026090 | A1 | * | 2/2011 | Minor | F41G 1/40 359/263 |
| 2012/0099191 | A1 | * | 4/2012 | Mannelqvist | G02B 27/0101 359/402 |
| 2014/0085716 | A1 | * | 3/2014 | Owen | F41H 5/266 359/402 |

FOREIGN PATENT DOCUMENTS

| | | |
|---|---|---|
| DE | 3627716 A1 | 2/1988 |
| DE | 10204976 B1 | 8/2003 |
| DE | 102008061701 A1 | 6/2010 |
| WO | 2010066220 A1 | 6/2010 |
| WO | 2010102597 A1 | 9/2010 |

* cited by examiner

*Primary Examiner* — Frank Font
(74) *Attorney, Agent, or Firm* — Laurence A. Greenberg; Werner H. Stemer; Ralph E. Locher

(57) ABSTRACT

A corner reflector for armored vehicles includes a housing, a one-part or multi-part prism block fitted in the housing, an inwardly viewing window, an outwardly viewing window and an electronic screen for simultaneously looking through and feeding in text and/or image information. The screen is formed of a thin flat or film-like component.

14 Claims, 2 Drawing Sheets

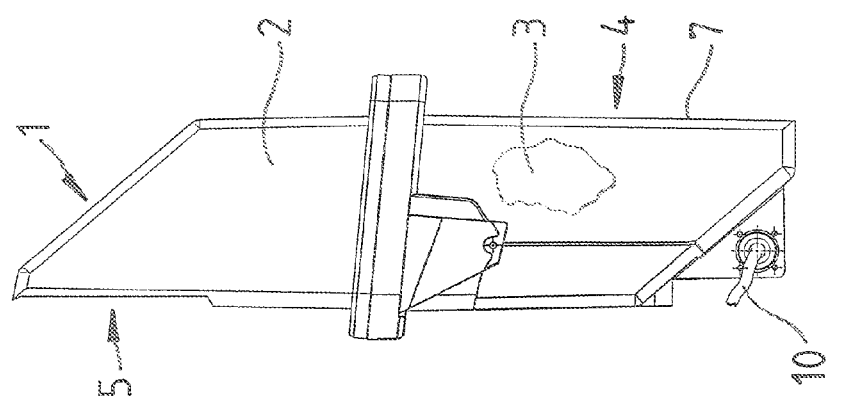
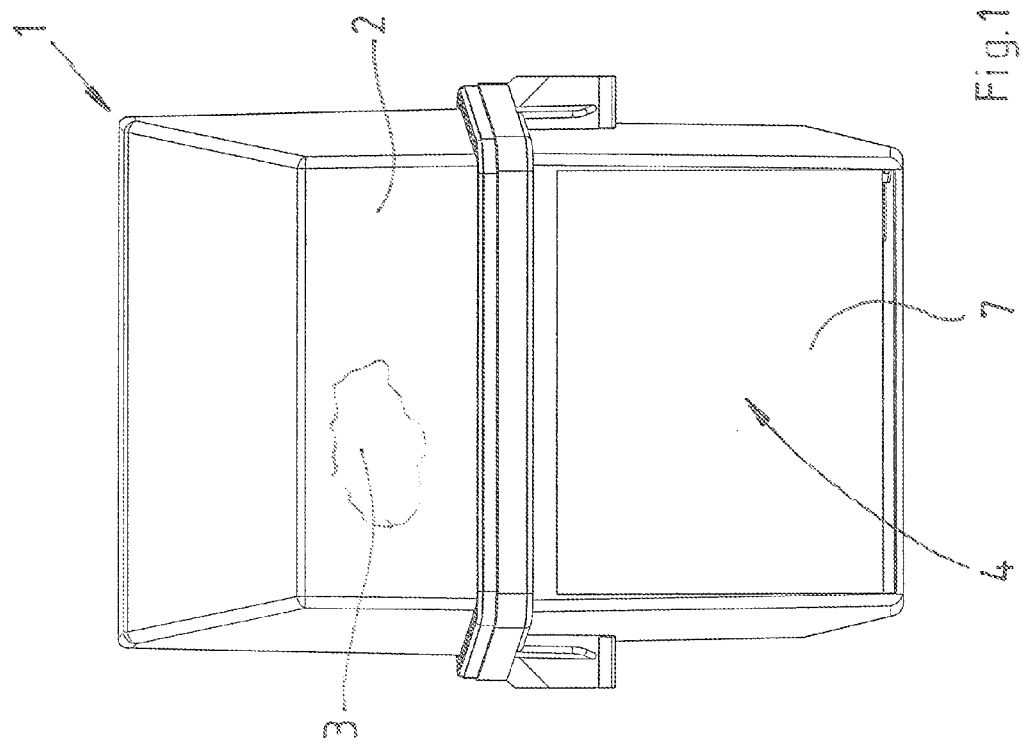

CORNER REFLECTOR

CROSS-REFERENCE TO RELATED APPLICATION

This application claims the priority, under 35 U.S.C. §119, of German Patent Application DE 10 2013 113 223.5, filed Nov. 29, 2013; the prior application is herewith incorporated by reference in its entirety.

BACKGROUND OF THE INVENTION

Field of the Invention

The invention relates to a corner reflector or periscope for armored vehicles, including a housing with a one-part or multi-part prism block fitted therein, an inwardly viewing window and an outwardly viewing window, as well as an electronic screen for simultaneously looking through and feeding in text and/or image information.

A known corner reflector configuration, disclosed in German Patent Application DE 36 27 716 A1, has a display unit with a display field on a surface of a prism block facing away from an inwardly viewing window for information that can be fed in. Those and other known display devices are often disadvantageously very large and need additional installation space, in particular for the electronics that are integrated in the display units, so that the dimensions of the housing have to be increased correspondingly.

SUMMARY OF THE INVENTION

It is accordingly an object of the invention to provide a corner reflector for armored vehicles, which overcomes the hereinafore-mentioned disadvantages of the heretofore-known devices of this general type and which is equipped with an electronic screen for simultaneously looking through and feeding in text or image information but can nevertheless be made with a very space-saving configuration. At the same time, the handling of the corner reflector with its electronic screen should have a functionally more reliable and further simplified construction.

With the foregoing and other objects in view there is provided, in accordance with the invention, a corner reflector for armored vehicles, comprising a housing with a one-part or multi-part prism block fitted therein, an inwardly viewing window and an outwardly viewing window, and an electronic screen for simultaneously looking through and feeding in text and/or image information, the screen being formed of a thin flat or film-like or film-shaped component.

Such a film-like component allows it to be used in a conventional corner reflector, without the dimensions of the housing of the corner reflector having to be significantly adapted, or adapted at all, to the component, and similarly the associated electronics of the corner reflector can be accommodated in a separate housing, and this housing can also be accommodated separately at a less exposed and safer place in the vehicle, which benefits the functional reliability of the corner reflector.

It is also of advantage in the case of such an inventive corner reflector that it can be easily exchanged for conventional corner reflectors, which have so far had to do without feeding in text and/or image information, since its overall size does not differ, or differs only slightly, from that of the known corner reflectors.

In accordance with another particularly advantageous feature of the invention, the component is formed of an OLED (Organic Light Emitting Diode) film or an electroluminescent layer. Such components are able to reproduce text, graphics and images photorealistically. Furthermore, such OLED films are very robust and work reliably within a great range of temperature and atmospheric humidity, so that the function of the electronic screen is still ensured even when it is used under demanding conditions in the field.

In accordance with a further advantageous feature of the invention, the component is disposed on the side of the prism block that is remote from the inwardly viewing window so that, when the screen is out of operation, the corner reflector is not restricted in its conventional function.

In accordance with an added preferred feature of the invention, the component is disposed in front of the inwardly viewing window of the corner reflector, for which purpose it is made to be of a transparent configuration in the current-free and voltage-free state, so that in this case too it remains possible to look through the corner reflector at any time.

Configurations of such components in front of and at the same time behind the prism block also provide a further enhanced possibility of providing information, such as for instance three-dimensional displays.

In accordance with an additional most particularly advantageous feature of the invention, the component is formed as a touch-sensitive screen, which is accompanied by significant advantages in operating the corner reflector, since additional switch components, control panels and mechanical levers can be omitted entirely, so that the screen, or even the corner reflector as a whole, can be operated by using corresponding surface areas, for instance an integrated camera can be adjusted in its viewing direction, aperture or its zoom range, whereby information on the terrain around a vehicle can be gathered much more easily and better.

In accordance with yet another preferable feature of the invention, the component is disposed on the prism block without any air gap, so that any air moisture that may be contained in the corner reflector cannot impair the view through it by causing it to mist over.

In accordance with yet a further advantageous feature of the invention, the component may be disposed or held on the prism block by an adhesive or adhesive film, whether it is in front of and/or behind the prism block.

In accordance with yet an added feature of the invention, in order to ensure operationally reliable functioning, a transparent heating foil and/or a radiation shielding glass may be provided between the prism block and the component, whereby the functional reliability of the corner reflector is further increased.

In accordance with a concomitant feature of the invention, a further advantage is provided by the great freedom of design of the corner reflector in its structural configuration, since the component may also be disposed only in front of partial regions of the inwardly viewing window, for instance only at the periphery or only at the top or only at the side, if other partial regions of the corner reflector have to remain free or are intended to be used for other purposes.

Other features which are considered as characteristic for the invention are set forth in the appended claims.

Although the invention is illustrated and described herein as embodied in a corner reflector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a diagrammatic, perspective view of a corner reflector as seen from an inwardly viewing side;

FIG. 2 is a left side-elevational view of the corner reflector according to FIG. 1.

DETAILED DESCRIPTION OF THE INVENTION

Figure 3:
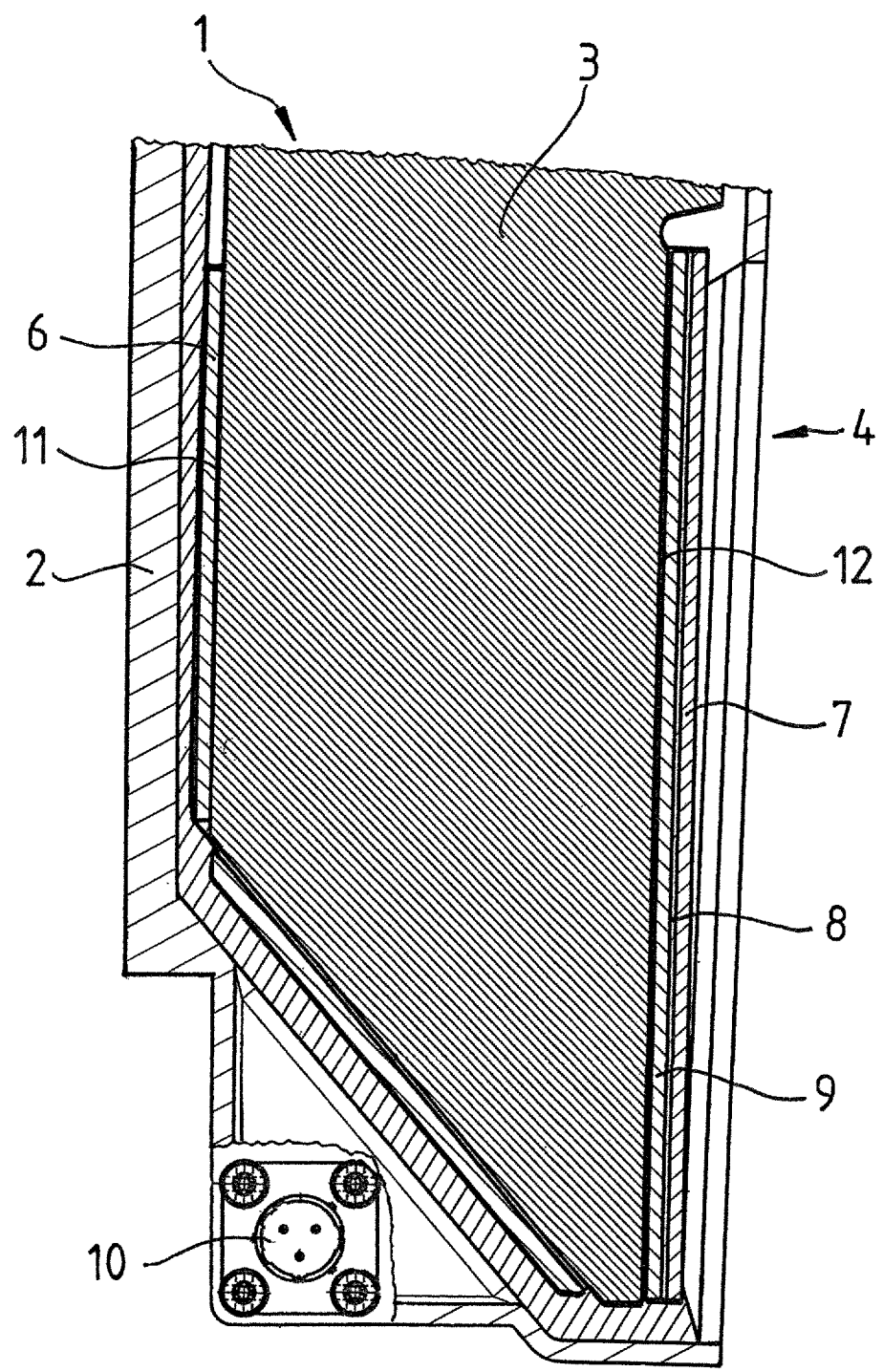
FIG. 3 is an enlarged, longitudinal-sectional side view of the corner reflector according to FIG. 2.

Referring now to the figures of the drawings in detail and first, particularly, to FIG. 1 thereof, there is seen a corner reflector or periscope 1 which is formed of a housing 2 that surrounds a one-part or multi-part prism block 3 and has an inwardly viewing window 4 inside the vehicle and an outwardly viewing window 5 outside the vehicle through the prism block 3.

The presentations in FIGS. 1 and 2 do not differ in principle from conventional corner reflectors, since the housings 2 can turn out to be substantially the same in terms of their construction. This is because thin flat and/or film-like components 6, 7 can be fitted in the housing 2 without any significant modifications, or any modifications at all, in particular if they are adhesively attached directly to the prism block 3 by an adhesive 11 or an adhesive film 12, as is shown in FIG. 3.

FIG. 3 shows, in particular, the lower region of a prism block 3 with a component 6 disposed behind the inwardly viewing window 4 and also a component 7 disposed in front of the inwardly viewing window 4. The component 7 in this case is additionally connected to a heating foil 8 and a radiation shielding glass 9, although the layer thicknesses represented are not shown to scale.

The corner reflector 1 is supplied with current and the components are provided with the information to be displayed through the use of a power and data feed line 10.

The invention claimed is:

1. A corner reflector for armored vehicles, the corner reflector comprising:
   a housing;
   a one-part or multi-part prism block fitted in said housing;
   an inwardly viewing window associated with said housing;
   an outwardly viewing window associated with said housing; and
   an electronic screen associated with said housing for simultaneously looking through by a user and feeding in at least one of text or image information, said screen being formed of a thin flat or film-shaped component, said component being formed as a touch-sensitive screen, said component being transparent in a current-free and voltage-free state and said component being disposed in front of said inwardly viewing window as seen in a viewing direction of the user.

2. The corner reflector according to claim 1, wherein said prism block has a side remote from said inwardly viewing window, and said component is disposed on said side of said prism block remote from said inwardly viewing window.

3. The corner reflector according to claim 1, wherein said component is disposed on said prism block without any air gap therebetween.

4. The corner reflector according to claim 1, wherein said component is fixed on said prism block by an adhesive or adhesive film.

5. The corner reflector according to claim 1, which further comprises at least one of a transparent heating foil or a radiation shielding glass disposed between said prism block and said component.

6. The corner reflector according to claim 1, wherein said component is disposed only in front of or behind partial regions of said inwardly viewing window in the viewing direction of the user.

7. The corner reflector according to claim 1, wherein said touch-sensitive screen completely operates the corner reflector without any mechanical operating elements.

8. A corner reflector for armored vehicles, the corner reflector comprising:
   a housing;
   a one-part or multi-part prism block fitted in said housing;
   an inwardly viewing window associated with said housing;
   an outwardly viewing window associated with said housing; and
   an electronic screen associated with said housing for simultaneously looking through by a user and feeding in at least one of text or image information, said screen being formed of a thin flat or film-shaped component, said component being formed of an OLED film (Organic Light Emitting Diode) or an electroluminescent layer, said component being formed as a touch-sensitive screen, said component being transparent in a current-free and voltage-free state and said component being disposed in front of said inwardly viewing window as seen in a viewing direction of the user.

9. The corner reflector according to claim 8, wherein said touch-sensitive screen completely operates the corner reflector without any mechanical operating elements.

10. The corner reflector according to claim 8, wherein said prism block has a side remote from said inwardly viewing window, and said component is disposed on said side of said prism block remote from said inwardly viewing window.

11. The corner reflector according to claim 8, wherein said component is disposed on said prism block without any air gap therebetween.

12. The corner reflector according to claim 8, wherein said component is fixed on said prism block by an adhesive or adhesive film.

13. The corner reflector according to claim 8, which further comprises at least one of a transparent heating foil or a radiation shielding glass disposed between said prism block and said component.

14. The corner reflector according to claim 8, wherein said component is disposed only in front of or behind partial regions of said inwardly viewing window.

* * * * *